United States Patent [19]

Grimble et al.

[11] Patent Number: 4,812,373
[45] Date of Patent: Mar. 14, 1989

[54] FUEL FEED ARRANGEMENT FOR A FUEL CELL GENERATOR

[75] Inventors: Ralph E. Grimble, Finleyville; Edward V. Somers, Murrysville, both of Pa.

[73] Assignee: Westinghouse Electric Corp., Pittsburgh, Pa.

[21] Appl. No.: 852,865

[22] Filed: Apr. 16, 1986

[51] Int. Cl.⁴ ............................................. H01M 8/18
[52] U.S. Cl. ........................................ 429/19; 429/17; 429/34; 429/39
[58] Field of Search ................. 429/34, 39, 17, 19

[56] References Cited

U.S. PATENT DOCUMENTS

| | | | |
|---|---|---|---|
| 3,279,950 | 10/1966 | Kordesch et al. | 429/17 |
| 4,200,682 | 4/1980 | Sederquist | 429/17 |
| 4,374,184 | 2/1983 | Somers et al. | 429/17 |
| 4,395,468 | 7/1983 | Isenberg | 439/31 |

Primary Examiner—John F. Niebling
Assistant Examiner—Steven P. Marquis
Attorney, Agent, or Firm—Daniel P. Cillo

[57] ABSTRACT

A fuel cell generator is made containing a plurality of fuel cells and fuel feed conduits exterior to and disposed between the fuel cells to distribute unreformed fuel feed to the exterior surface of the fuel cells, where the exterior surface of the fuel cells is effective to reform the fuel feed.

10 Claims, 3 Drawing Sheets

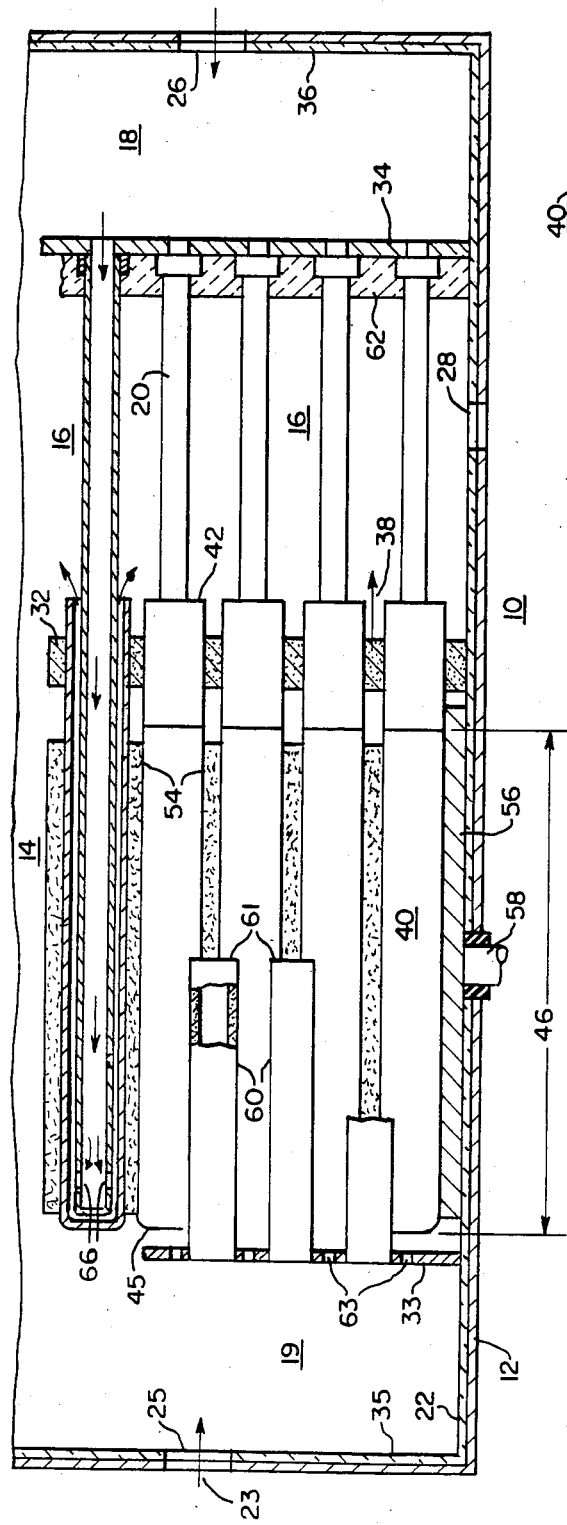
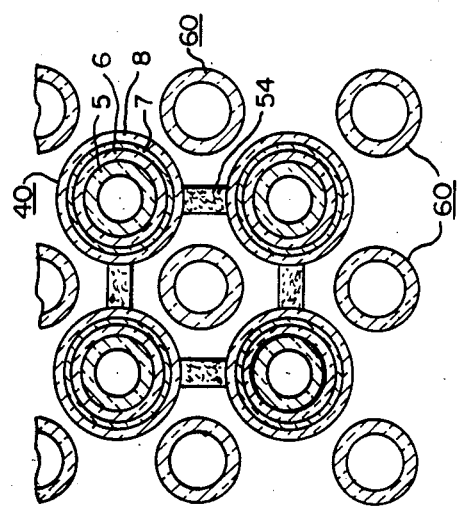
FIG. 3.
FIG. 4.

FUEL FEED ARRANGEMENT FOR A FUEL CELL GENERATOR

BACKGROUND OF THE INVENTION

High temperature solid electrolyte fuel cells convert chemical energy into direct current electrical energy, through an exothermic electrochemical reaction, typically at temperatures above 800° C. The reaction takes place at the electrode-electrolyte interfaces where the electrolyte is sandwiched between an anode and a cathode. The reaction usually involves a relatively pure fuel, for example a mixture of hydrogen and carbon monoxide, and an oxidant such as oxygen or air. Where hydrogen and carbon monoxide fuel is utilized in a fuel cell system, it is provided from a reformer, upstream of a fuel cell stack. The external reformer reacts, for example, hydrocarbons, natural gas, or alcohols with steam in an endothermic process to produce a fuel suitable for the fuel cells, such as hydrogen and carbon monoxide mixtures. One generator system, utilizing such externally reformed fuels is taught by Isenberg, in U.S. Pat. No. 4,395,468.

The endothermic reaction at the external reformer requires substantial heat input. If excess heat from the fuel cell generator is used, in an external reformer, complicated refractory ducting systems would be required. Somers et al., in U.S. Pat. No. 4,374,184 sought to alleviate the inefficiencies of external reformers by providing in-situ reforming of fuel feed, such as methane mixed with steam, on an electrically inactive portion of a tubular fuel cell, as shown in FIG. 1 of the drawings.

In the prior art apparatus of FIG. 1, the fuel cell generator 10 includes a gas tight housing 12 with interior thermal insulation 22 surrounding an oxidant inlet chamber 18, a preheating chamber 16 with exhaust gas outlet 28, generating chamber 14 and fuel inlet and distribution chamber 19. Oxidant, such as air, enters inlet 26, flows through conduits 20 into the interior of fuel cells 40, reverses direction inside the fuel cell and exits into preheating chamber 16. Fuel feed, such as a CH$_4$+steam mixture, enters distribution chamber 19, flows through perforated wall 30 and is reformed at the electrically inactive portion 44 of the fuel cells 40. Thermal energy for this endothermic reaction is carried by the airstream. The reformed gas, now containing H$_2$+CO, then reacts at the active portions 46' of the fuel cells before passing, as depleted fuel, into the preheating chamber 16 to combust with the depleted oxidant, to heat incoming oxidant passing through conduits 20.

The diffusion of reformable fuel, such as methane, from the fuel feed, i.e., the transverse diffusion velocity, to the fuel cell wall is very high, so that the reformable fuel concentration in the fuel feed will decrease rapidly along the fuel cell length if catalysis at the fuel cell wall is efficient. Usually, all the reformable fuel needed for the full length of the fuel cell will be reformed in the first ⅓ of the each fuel cell length.

The exterior of the inactive fuel cell ends 44 contains catalyst, such as nickel, effective to reform the fuel gas at elevated temperatures. These "inactive" ends, i.e., inactive to generate power but capable of reforming gases, can be made without an underlying air electrode, or bare of electrical contacts to the air electrode. As can be seen, however, a large portion of active electrode length is lost, unless the entire generator is made longer, adding to material costs and space requirements. Also, the reforming reaction is endothermic, cooling the inactive end of the fuel cell from 100° C. to 250° C. below the active end; which could cause thermal stresses on the fuel cell tubes, which are generally of a layered ceramic design, with possible resultant cracking, unless temperature controls are carefully monitored. What is needed then is a more effective means to in-situ reform fuel feed in a fuel cell generator.

SUMMARY OF THE INVENTION

The above needs have been met, and the above problems solved, by providing separate fuel feed conduits exterior to and disposed between the fuel cells, to distribute unreformed fuel feed reactant along the entire exterior active length of the fuel cells and to allow reforming of the fuel feed along the entire exterior active length of the fuel cells. By "reforming" is meant the reaction of carbon-based fuel gases with steam at a high temperature, usually with a catalyst, resulting in the formation of H$_2$ and CO. In this design, the endothermic reforming reaction is more or less equally distributed along the entire fuel cell length with little or no reforming temperature gradient along the fuel cell length. Such in-situ reforming in the active area would not cause loss of active fuel cell area. The term "carbon-based fuel gases" is meant to include hydrocarbones that are in gaseous form room temperature, vaporized petroleum fractions such as naptha, and alcohols such as methyl or ethyl alcohol.

The unreformed fuel feed, i.e., reformable carbon-based fuel gas such as CH$_4$ plus steam, can be fed to the fuel cells through highly porous or perforated close ended tubes, about as long as the fuel cells, where unreformed fuel feed would diffuse out along substantially the entire fuel cell length. This system would require a moderate driving pressure. Alternatively, a system utilizing minimal driving pressure would pass the unreformed fuel feed through open tubes, about ¼ to ¾ as long as the fuel cells, and simultaneously through support plate perforations in the sheet separating the fuel inlet and distribution chamber from the generating chamber. Such systems eliminate external reformation, retain maximum active fuel cell activity, and eliminate reforming temperature gradients along the fuel cell length.

BRIEF DESCRIPTION OF THE DRAWINGS

For a better understanding of the invention, reference may be made to the preferred embodiments, exemplary of the invention, shown in the accompanying drawings in which:

FIG. 3 is a view, partially in section, of another embodiment of the in-situ fuel gas reforming fuel cell generator of this invention; and FIG. 4 is a cross-sectional view through one embodiment of the fuel cell and fuel feed conduit bundle in the fuel cell generator of this invention.

DESCRIPTION OF THE PREFERRED EMBODIMENTS

Figure 1:
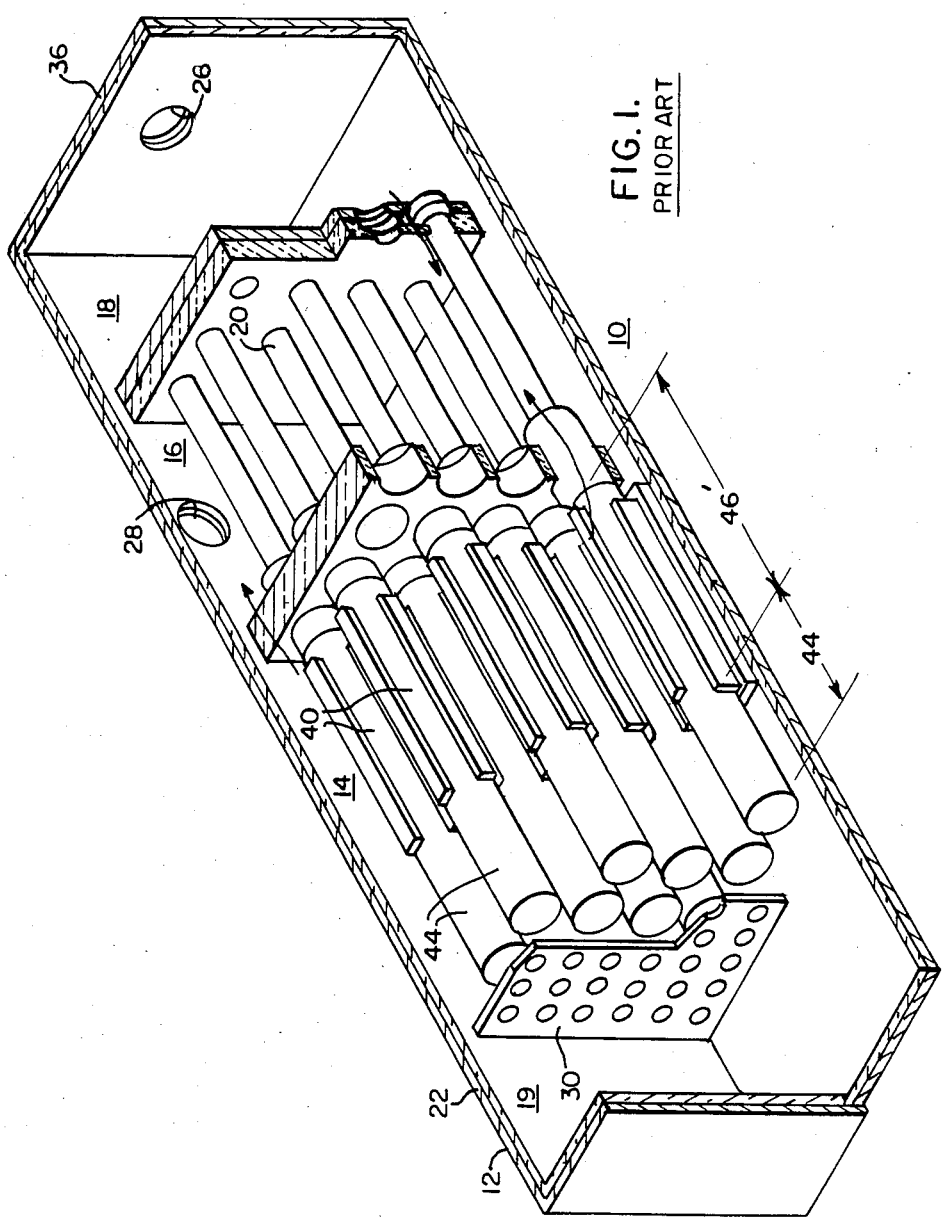
FIG. 1 is a broken perspective view of a prior art, in-situ fuel gas reforming fuel cell generator, where the inactive ends of the plurality of fuel cells act as a reformer.
Figure 2:
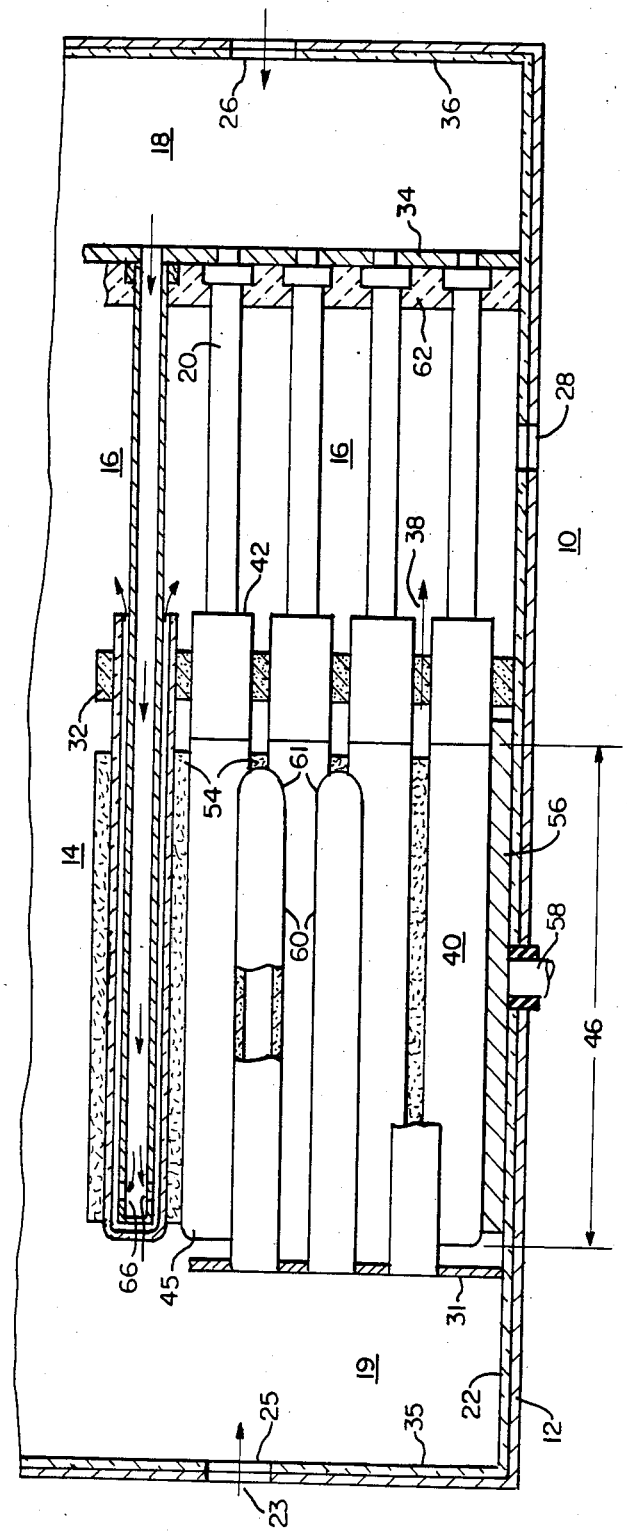
FIG. 2 is a view, partially in section, of one embodiment of the in-situ fuel gas reforming fuel cell generator of this invention, where the entire active fuel cell length acts as a reformer.

Referring now to FIGS. 2 and 3 of the drawings, which illustrate the fuel feed arrangement of this invention, there is shown a fuel cell generator 10 including a gas tight housing 12. The fuel cell generator will operate in the range of from about 700° C. to about 1200° C. The housing 12 surrounds a plurality of chambers, including a generating chamber 14 and a combustion product or preheating chamber 16. Also provided is a reformable reactant inlet chamber 19. An oxidant inlet chamber 18 can also be contained within the housing 12. Alternatively, other means for manifolding an oxidant into oxidant or air conduits 20 can be utilized.

The housing 12 is preferably comprised of Inconel, and lined inside or outside with a thermal insulation 22 such as low density alumina insulation. Penetrating the housing 12 and insulation 22 is a reformable medium inlet port 25, an air inlet port 26, and combustion product outlet port(s), not shown, for hot exhaust gas, as well as ports for electrical leads 58, connected to current collectors 56. The combustion product outlet port(s) can be in preheating chamber 16, pass through oxidant inlet chamber 18, or be of any other design.

The generating chamber 14 extends between wall 31 of FIG. 2 or wall 33 of FIG. 3, and a porous barrier 32. The preheating chamber 16, in the embodiments shown, extends between the porous barrier 32 and a tube support structure such as a tube sheet 34 which is covered with an insulation 62, such as low density alumina. The oxidant inlet chamber 18, in the embodiments shown, extends between the tube sheet 34 and an end wall 36 of the housing 12. The reformable reactant inlet chamber 19 extends between either wall 31 or 33 and end wall 35. The shown porous barrier 32 and the tube sheet 34 need not be sealed structures. The porous barrier 32, in particular, is designed to allow flow between the generating chamber 14, operating at an approximate pressure slightly above atmospheric, and the preheating chamber 16, operating at a slightly lower pressure, as indicated by arrow 38. While the generator 10 is shown in a horizontal orientation, it is usually operated in a vertical position.

High temperature, elongated, solid oxide electrolyte fuel cells 40 extend between the preheating chamber 16 and the reformable reactant inlet chamber 19. The cells have open ends 42 in the preheating chamber 16, and closed ends at 45 in the generating chamber 14. The fuel cells are preferably tubular, including a solid oxide electrolyte sandwiched between two electrodes, supported on a porous tubular support. Each cell includes electrochemically active length 46 which can extend the entire linear length of the generating chamber 14. No inactive fuel cell length is required in this invention, therefore, active fuel cell surface area is maximized within a given generating chamber length.

FIG. 4 shows a cross section through the active length 46, of a plurality of fuel cells 40 and fuel feed conduits 60, with oxidant conduits within each fuel cell eliminated for the sake of simplicity. As shown, conduits 60 are preferably of a tubular design. Serially from the interior area radially outward, the cross section includes a porous tubular support 5, a porous electrode 6 such as an air cathode, the solid electrolyte 7, and a second porous electrode 8 such as a fuel anode, all to comprise the fuel cell. Each individual cell generates approximately one volt open circuit, and a plurality are electrically interconnected through conducting felts 54, preferably in a series-parallel rectangular array, as described in U.S. Pat. No. 4,395,468, herein incorporated by reference.

The oxidant air feed conduits 20, shown in FIGS. 2 and 3 but not in FIG. 4, pass into the open end 42 of the fuel cells 40, within the porous support 5, a single oxidant conduit 20 corresponding to a single fuel cell. Each oxidant conduit 20 extends the active length of the fuel cell, and preferably close to the inside of the closed end 45 of the cell, the oxidant conduit 20 being inserted close to, but spaced from the inside of the closed end 45. Radial supports can be utilized to support each oxidant conduit 20 within the corresponding fuel cell 40. Each oxidant conduit is provided with a means for discharging an oxidant reactant medium into the fuel cell 40, such as openings 66, shown in FIGS. 2 and 3, at the conduit end. The oxidant conduits can also be open ended and spaced from the inside of the end 45 of the fuel cell. The porous barrier 32, which allows a throughput of depleted fuel, is preferably a porous ceramic baffle, such as one comprised of fibrous alumina felt, or ceramic plate segments with porous inserts such as ceramic wool plugs, surrounding each fuel cell 40.

During operation, an oxidant such as air enters the oxidant feed conduits 20 at a temperature of approximately 500° C. to 700° C., and a pressure above atmospheric, being optionally heated prior to entering the housing by conventional means such as a heat exchanger coupled with a blower. The air flows into the oxidant conduits, and is passed through the preheating chamber 16, where it is further heated to a temperature of approximately 800° C. to 900° C. The air then flows through the length of the oxidant conduit, being further heated to approximately 1000° C., by virtue of absorbing most of the heat generated during the electrochemical reaction. A smaller fraction of the heat is absorbed by the fuel feed. The air is then discharged through the openings 66 into the fuel cell 40. The air within the fuel cell electrochemically reacts at the fuel cell cathode along the active length, depleting somewhat in oxygen content as it approaches the open end 42 of the cell. The depleted air is then discharged into the combustion product or preheating chamber 16.

In this invention, a carbon-based fuel gas that has not yet been reformed, such as a hydrocarbon, including hydrocarbons such as methane ($CH_4$), ethane ($C_2H_6$), propane $C_3H_8$), and the like, vaporized petroleum fractions such as naptha, and alcohols, such as ethyl alcohol ($C_2H_5OH$), and the like; and natural gas, i.e., a mixture of 85% methane, and 10% ethane with a balance of propane, butane and nitrogen, can be used. These reformable carbon-based fuel mediums are mixed with from about 125 volumes to about 200 volumes of steam per 100 volumes of reformable carbon-based fuel, to form the fuel feed mixture.

The steam has an associated heater and tubing leading to a mixer where it is mixed with the reformable carbon-based fuel to provide the fuel feed mixture 23 which enters the reformable reactant inlet chamber 19. The exterior of the fuel cell operates at a temperature of from about 800° C. to about 1200° C. Steam is required in the amounts hereinbefore set forth to prevent carbon caking deposits on the various conduits and tubes. Excess steam over the range set forth will reduce the open circuit voltage of the fuel cells.

In this invention, the steam and reformable carbon-based fuel mixture, from chamber 19, is passed into fuel feed conduits 60 exterior to and disposed between the fuel cells 40, as shown most clearly in FIG. 4. The conduits 60 can be made of a porous or minutely perforated, high temperature resistant material, preferably a ceramic, such as zirconia, somewhat similar to the material used in the porous support 5 of the fuel cell. Other materials could include alumina and the like ceramics. Porosity of the conduits should be from about 20% to 40%, i.e., 60% to 80% of theoretical density, to provide adequate fuel feed mixture permeability for the conduits. This parameter is much less critical for the open conduit design of FIG. 3.

Fuel feed conduit outside diameter could be from about 0.1 inch to 0.2 inch with a wall thickness of from about 0.010 inch to 0.020 inch for presently used cell diameters. These dimensions would, of course, vary with the fuel cell dimensions. As shown in FIG. 2, the fuel feed conduits 60 have ends 61 which are closed. In this embodiment, the steam and reformable fuel would diffuse out of the closed porous conduits 60 along the entire length, to allow equalized contact of fuel feed mixture along the entire linear active length 46 of the fuel cells. Metal or ceramic plate 31 would help support the conduits 60.

In another embodiment, shown in FIG. 3, the fuel feed conduits 60 have ends 61 which are open, and plate 33, which helps support the conduits 60, has small perforations or openings 63 therethrough. Here, the steam and reformable fuel would pass through and out of the conduit 60 almost entirely at open end 61, which would be from about ¼ to ¾ of the fuel cell active length 46 toward the preheating chamber 16. The open end 61 would allow contact of fuel feed from the middle to the preheater ends of the fuel cells and the steam and reformable fuel passing through the perforated openings 63 in the support plate 33 would allow contact of fuel feed along the fuel cells from the fuel feed inlet chamber 19 to the middle of the fuel cells. The openings 63 would be sized to get the correct proportion of flow through them. The actual size relative to the I.D. of the fuel feed tubes 60 will depend on the viscosity of the fuel mixture being reformed. In general, the openings 63 will be smaller than the I.D. of feed tubes 60.

In both embodiments, the fuel feed is distributed along the entire length of the fuel cells, which length is all electrically active and capable of reforming the reformable fuel feed. The fuel feed mediums diffuse to the fuel electrode surface adjacent the electrolyte, a portion being catalyzed to form $H_2$ and CO. Also at the fuel electrode surface, oxygen ions have been transported across the cell electrolyte to the fuel electrode where they combine with most of the reformed products $H_2$ and CO. They may also combine directly with some of the unreformed medium, such as methane, which is present. The combustion products arising from the oxygen reaction diffuse into the generating chamber between the fuel electrodes where they are transported to the exhaust end of the generating chamber. There they are exhausted along with unreacted $H_2$, CO and trace $CH_4$, present at the exhaust end, through the porous barrier 32.

The reforming reaction, using methane gas as an example is:

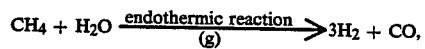

and, the generating reactions using the reformed fuel are:

where nickel or other catalyst present in the exterior fuel electrode of the fuel cells provides the catalyst for both reactions. In both embodiments, the endothermic reforming reaction is more or less equally distributed along the entire fuel cell length with little or no reforming temperature gradient along the fuel cell length. In both FIGS. 2 and 3, the bottom fuel conduit is shown broken away to more clearly expose the conducting felt and underlying fuel cells.

The reformed $H_2+CO$ fuel would flow over and about the exterior of the fuel cells, electrochemically reacting at the fuel electrode. The reformed fuel accordingly depletes as it approaches the porous barrier 32. The depleted fuel, containing approximately five percent to fifteen percent of its initial fuel, content reformed $H_2+CO$, flows or diffuses through the barrier 32 and into the preheating chamber 16 where it contacts the depleted air.

The partially depleted air and fuel, directly react exothermically, and combust at a temperature of about 1000° C. in preheating chamber 16. The heat of this reaction, which completely combusts the fuel, along with the sensible heat of the depleted fuel and air, are utilized to preheat the incoming air. The combustion products are discharged through combustion product outlet port(s), not shown, at a temperature of 900° C. or less.

Since numerous changes may be made in the above-described arrangement without departing from the spirit and scope thereof, it is intended that all matter contained in the foregoing be interpreted as illustrative, and not in a limiting sense.

We claim:

1. A fuel cell generator comprising a generating chamber containing a plurality of fuel cells and fuel feed conduits, surrounded by a housing, where each fuel cell comprises an inner oxidant electrode and an exterior fuel electrode, with solid oxide electrolyte between the inner and exterior electrodes, the fuel feed conduits are exterior to and disposed between the fuel cells to distribute unreformed fuel feed to the exterior electrode surfaces of the fuel cells, and essentially the total linear length of the exterior electrode surfaces of the fuel cells within the generating chamber are electrochemically active and effective to reform fuel feed.

2. The fuel cell generator of claim 1, comprising a fuel inlet chamber, an oxidant inlet chamber and a middle generating chamber containing the fuel cells, all surrounded by a housing, where oxidant is fed into the interior of the fuel cells.

3. The fuel cell generator of claim 1, where the fuel cells are of elongated tubular construction and where the fuel cell generator operates at temperatures of between about 700° C. and about 1200° C.

4. The fuel cell generator of claim 1, where the fuel feed contains reformable carbon-based fuel gas plus steam, and the total linear lengths of the fuel cells are active to effect reformation of said fuel feed to $H_2$ and CO.

5. The fuel cell generator of claim 1, where the fuel feed contains a reformable fuel selected from the group consisting of hydrocarbons, alcohols, natural gas mixtures, and mixtures thereof.

6. The fuel cell generator of claim 1, where the fuel feed conduits are a ceramic material, the exterior surface of the fuel cells contain nickel, and the exterior surfaces of the fuel cells are at a temperature of from about 800° C. to about 1200° C.

7. The fuel cell generator of claim 1, where the fuel feed conduits are porous or perforated and have closed ends and where the fuel feed diffuses therethrough.

8. The fuel cell generator of claim 1, where the fuel feed conduits are supported by a perforated support and have open ends and where the fuel feed passes through both the conduit and the perforations in the support.

9. The fuel cell generator of claim 7, where the fuel feed conduits are ceramic and extend substantially the entire length of the fuel cells linear surface.

10. The fuel cell generator of claim 8, where the fuel feed conduits are ceramic and extend from about $\frac{1}{4}$ to about $\frac{3}{4}$ of the length of the fuel cells from the conduit support.

* * * * *